(12) United States Patent
Wang et al.

(10) Patent No.: US 11,951,445 B2
(45) Date of Patent: Apr. 9, 2024

(54) PHOTOTHERMAL PHOTOCATALYTIC MEMBRANE FOR SEAWATER DESALINATION AND URANIUM EXTRACTION AND PREPARATION METHOD THEREFOR

(71) Applicant: Harbin Engineering University, Harbin (CN)

(72) Inventors: Jun Wang, Harbin (CN); Bingtao Zhang, Harbin (CN); Hongsen Zhang, Harbin (CN); Qi Liu, Harbin (CN); Jiahui Zhu, Harbin (CN); Jingyuan Liu, Harbin (CN); Jing Yu, Harbin (CN); Rongrong Chen, Harbin (CN); Lele Wang, Harbin (CN)

(73) Assignee: Harbin Engineering University (CN)

( * ) Notice: Subject to any disclaimer, the term of this patent is extended or adjusted under 35 U.S.C. 154(b) by 0 days.

(21) Appl. No.: 18/195,735

(22) Filed: May 10, 2023

(65) Prior Publication Data

US 2023/0381719 A1    Nov. 30, 2023

(30) Foreign Application Priority Data

May 31, 2022   (CN) .......................... 202210604070.2

(51) Int. Cl.
*B01D 69/14*   (2006.01)
*B01D 61/02*   (2006.01)
(Continued)

(52) U.S. Cl.
CPC ...... *B01D 69/145* (2013.01); *B01D 67/00113* (2022.08); *B01D 67/0013* (2013.01);
(Continued)

(58) Field of Classification Search
None
See application file for complete search history.

(56) References Cited

U.S. PATENT DOCUMENTS

| | | |
|---|---|---|
| 10,843,138 B1 | 11/2020 | Ismail et al. |
| 2014/0294701 A1 | 10/2014 | Dai et al. |

(Continued)

FOREIGN PATENT DOCUMENTS

| | | |
|---|---|---|
| CN | 106457201 A | 2/2017 |
| CN | 110496544 A | 11/2019 |

(Continued)

OTHER PUBLICATIONS

Search Report dated Oct. 9, 2022 from Office Action for Chinese Application No. 202210604070.2 dated Oct. 13, 2022. 1 pg.

(Continued)

*Primary Examiner* — Jason M Greene
*Assistant Examiner* — Eric J McCullough
(74) *Attorney, Agent, or Firm* — Lerner David LLP

(57) ABSTRACT

The present disclosure relates to the field of materials for uranium extraction from seawater (UES), and in particular, to a photothermal photocatalytic membrane for seawater desalination and uranium extraction and a preparation method therefor. The present disclosure provides a photothermal photocatalytic membrane for seawater desalination and uranium extraction and a preparation method therefor. The preparation method includes: fixing a treated carbon cloth to a glass plate, pouring a casting solution 1 onto the carbon cloth to form a first layer of film, forming a second layer of film using a casting solution 2, and putting the second layer of film into a first coagulation bath and a second coagulation bath in sequence to form the photothermal photocatalytic membrane. The photothermal photocatalytic membrane is supported by the carbon cloth, and a surface of the photothermal photocatalytic membrane is of a micro-nano structure.

9 Claims, 9 Drawing Sheets

(51) Int. Cl.
   *B01D 67/00*   (2006.01)
   *B01D 69/02*   (2006.01)
   *B01D 69/10*   (2006.01)
   *B01D 71/42*   (2006.01)
   *C02F 1/30*    (2023.01)
   *C02F 1/44*    (2023.01)
   *C02F 1/70*    (2023.01)
   *C02F 101/20*  (2006.01)
   *C02F 103/08*  (2006.01)

(52) U.S. Cl.
   CPC ... *B01D 67/0016* (2013.01); *B01D 67/00793* (2022.08); *B01D 69/02* (2013.01); *B01D 69/105* (2013.01); *B01D 69/108* (2022.08); *B01D 69/14111* (2022.08); *B01D 71/421* (2022.08); *B01D 61/025* (2013.01); *B01D 2323/081* (2022.08); *B01D 2323/12* (2013.01); *B01D 2323/21* (2013.01); *B01D 2323/21813* (2022.08); *B01D 2323/21817* (2022.08); *B01D 2323/2185* (2022.08); *B01D 2323/2187* (2022.08); *B01D 2323/22* (2013.01); *B01D 2323/56* (2022.08); *B01D 2325/025* (2013.01); *B01D 2325/34* (2013.01); *C02F 1/30* (2013.01); *C02F 1/441* (2013.01); *C02F 1/70* (2013.01); *C02F 2101/20* (2013.01); *C02F 2103/08* (2013.01)

(56) References Cited

U.S. PATENT DOCUMENTS

| | | | |
|---|---|---|---|
| 2017/0014780 | A1 | 1/2017 | Birss et al. |
| 2022/0288534 | A1 | 9/2022 | Sun et al. |

FOREIGN PATENT DOCUMENTS

| | | |
|---|---|---|
| CN | 113694953 A | 11/2021 |
| CN | 114522666 A | 5/2022 |
| CN | 114931862 B | 11/2022 |
| EP | 3928853 A1 | 12/2021 |
| JP | 2019202314 A | 11/2019 |
| KR | 102185206 B1 | 12/2020 |
| WO | 2021036879 A1 | 3/2021 |
| WO | 2021091476 A1 | 5/2021 |
| WO | 2022019834 A1 | 1/2022 |

OTHER PUBLICATIONS

Supplemental Search Report dated Oct. 17, 2022 from Office Action for Chinese Application No. 202210604070.2 dated Oct. 21, 2022. 1 pg.

PHOTOTHERMAL PHOTOCATALYTIC MEMBRANE FOR SEAWATER DESALINATION AND URANIUM EXTRACTION AND PREPARATION METHOD THEREFOR

CROSS REFERENCE TO RELATED APPLICATION

This patent application claims the benefit and priority of Chinese Patent Application No. 202210604070.2, filed with the China National Intellectual Property Administration on May 31, 2022, the disclosure of which is incorporated by reference herein in its entirety as part of the present application.

TECHNICAL FIELD

The present disclosure relates to the field of materials for uranium extraction from seawater (UES), and in particular, to a photothermal photocatalytic membrane for seawater desalination and uranium extraction and a preparation method therefor.

BACKGROUND

Converting seawater into fresh water can effectively alleviate the crisis of fresh water resources, and seawater desalination technology came into being. Seawater desalination refers to the process of dividing seawater into fresh water (with excess salts and minerals removed from seawater) and saltwater concentrate (which has a much higher concentration of dissolved salts than raw water).

Uranium resources on land in China are scarce and the reserves of uranium resources in seawater are huge. Uranium extraction from seawater is considered an important way to realize sustainable development of nuclear energy in China. The seawater desalination and uranium extraction from seawater can effectively reduce the cost of related equipment and power engineering, improve the efficiency of uranium extraction from seawater, and promote the industrialization process of uranium extraction from seawater. Firstly, the seawater desalination power system is used to improve the external migration rate of the adsorption process. Secondly, the seawater desalination pretreatment system is used to remove the corresponding interference components and indirectly improve the adsorption selectivity. Thirdly, the seawater desalination and uranium extraction from seawater can reduce the cost of the adsorbent delivery. In addition, the marine biofouling is reduced, the recycling efficiency of materials is improved, and manufacturing costs are indirectly reduced.

During seawater desalination, the reverse osmosis (RO) membrane is easy to be polluted and has a short service life. Due to the complex composition of seawater, an appropriate pretreatment technology is conducive to reducing the membrane pollution in the RO process, reducing the times of membrane cleaning, prolonging the service life of the membrane, and further reducing the cost of water production. The traditional pretreatment methods mainly include coagulation sedimentation, coagulation air flotation and granular media filtration (GMF). Compared with the traditional pretreatment methods, the membrane filtration method has more excellent water quality and retention for algal cells and bacteria, which is more conducive to reducing membrane pollution in subsequent RO process and reducing water production cost of seawater reverse osmosis (SWRO) process.

Although the uranium extraction from seawater and seawater desalination has obvious advantages in the adsorption efficiency and extraction cost, there are many limitations in the application of traditional uranium extraction by adsorption in the field of seawater desalination and uranium extraction from seawater.

Limit of adsorption capacity and adsorption rate: the adsorption capacity is usually determined by the number of adsorption active sites on the material. However, the active sites of adsorption materials cannot be regenerated during adsorption, so it is difficult to recycle. The uranyl ions need to undergo external migration, liquid membrane migration, internal migration and adsorption reactions in the process of uranium extraction from seawater. Moreover, adsorption is a dynamic process, which takes a long time to reach adsorption equilibrium. Therefore, it is difficult for conventional adsorption process to synchronize with seawater desalination and meet the needs of actual co-production.

Limit of adsorption selectivity: the composition of seawater is complex, and there are many competitive ions such as $Na^+$, $K^+$, $Ca^{2+}$, $Mg^{2+}$, $Cu^{2+}$, and $Fe^{3+}$, which is a great challenge for the design and application of adsorption materials. The competitive ion problem is particularly prominent in the application of seawater desalination and uranium extraction from seawater. Therefore, higher selectivity of adsorption materials is required in the process of seawater desalination and uranium extraction from seawater.

The addition of oxidant sodium hypochlorite during pretreatment of seawater desalination has an important effect on the water production of ultrafiltration membrane and the extraction of uranium. The sodium hypochlorite is added to seawater. According to the mass transfer theory, a greater concentration of sodium hypochlorite indicates a deeper position it can reach, and a stronger destructive effect. When the filter cake layer is destroyed, it loses the mesh filtration and adsorption effect, small particles squeeze through the membrane into the producing water, reducing the water quality. When the sodium hypochlorite is added to seawater, uranium dioxide, the redox product of sodium hypochlorite, becomes uranyl ion, which is redissolved into seawater, thus losing the function of uranium extraction.

The core technical problem of photocatalytic uranium extraction from seawater is that the reduction product uranium dioxide cannot be separated from the adsorption material. A large number of studies have shown that the reduction product uranium dioxide is unstable, and it is easily oxidized into uranyl ions and dissolved in seawater. Due to the extremely low content of uranium in seawater, the extraction process is a long period. In this process, uranium dioxide is separated from the catalyst, lacking the continuous supply of photoelectrons, and it is further oxidized into uranyl ions and dissolved into seawater, thus losing the function of uranium extraction. Therefore, it is necessary to constantly separate the reduction product uranium dioxide to avoid its dissolution in seawater after oxidation. However, the existing photocatalytic materials are mainly powder materials, and the insoluble uranium dioxide precipitated from the solution after photocatalytic reduction is separated from the surface of the material. It is difficult to separate the uranium dioxide from the photocatalytic materials by the existing means when the uranium dioxide is uniformly mixed with the photocatalytic materials under the scouring and stirring of the water.

To prepare a multifunctional separation membrane which can realize sterilization, photocatalysis, and separation, and has certain mechanical properties, it is usually necessary to add a variety of components. However, when a variety of components is added to the casting solution, since the compatibility between the components is different, it is difficult to prepare a uniform casting solution, and it is difficult to prepare a membrane with certain separation function. In addition, the requirements for the membrane preparation process are very high.

SUMMARY

Based on problems existing in the prior art, the present disclosure provides a photothermal photocatalytic membrane for seawater desalination and uranium extraction and a preparation method therefor. A technical concept of the present disclosure has the following characteristics.

In view of problem 1, the present disclosure prepares a photothermal photocatalytic membrane with carbon cloth as a support, polyacrylonitrile as a skeleton and titanium dioxide as a filler, which has a high retention effect on bacteria, colloid and sediment, and can be used for pretreatment of seawater desalination.

In view of problem 2, the present disclosure adopts carbon cloth as a support of a liquid layer of a membrane separation material. The carbon cloth can accelerate electron transmission and improve a photocatalytic rate while improving mechanical properties of the separation membrane, and the carbon cloth has photothermal properties and can improve the reaction rate. Photocatalysis can realize adsorption limitation and has high selectivity.

In view of problem 3, the nano titanium dioxide is introduced to make the surface of the prepared separation membrane have a micro-nano structure, thus improving the hydrophilicity of the separation membrane, improving the flux of the separation membrane, and achieving an antibacterial effect. There are different theoretical explanations on the antibacterial mechanism of the micro-nano structure. One theory holds that the micro-nano structure interacts with the cell membrane of bacteria, and the part of the cell membrane in contact with the micro-nano structure has high adhesion and stress, while the part without contact with the micro-nano structure ruptures due to tensile strain exceeding the limit of the cell membrane. The other theory explains that when bacteria move on the surface of the micro-nano structure, the shear force generated at the contact point is the main cause of cell membrane rupture. Oxygen free radicals generated by nano titanium dioxide can be used for sterilization, and the carbon cloth has photothermal properties, and can produce photothermal free radicals, which has a sterilization effect.

In view of problem 4, the nano titanium dioxide is introduced to photocatalytically reduce uranyl ions in seawater to uranium dioxide, which is insoluble in seawater. The separation membrane prepared by the present disclosure has a separation function, and the insoluble uranium dioxide can not pass through the separation membrane and is enriched and extracted in time on the concentrated water side of the separation membrane, so as to ensure the continuous operation of seawater desalination and uranium extraction from seawater.

A variety of functions are achieved through various synergistic effects. The carbon cloth can improve the mechanical properties of the separation membrane, the electron transmission efficiency, and the photocatalytic rate. The photothermal effect can improve the reaction rate and achieve sterilization.

The nano titanium dioxide can photocatalytically reduce uranium, generate oxygen free radicals for sterilization, and form the micro-nano structure on the surface of the separation membrane to increase the hydrophilicity and flux of the membrane. Polyacrylonitrile can fix the titanium dioxide to make the titanium dioxide uniformly distributed, and can achieve retention and removal of bacteria. A variety of synergistic effects are completed. Sterilization helps to extract uranium, and consumes free radicals, which in turn consumes holes, helping to extract uranium. The three are complementary and interact with each other to form a whole, rather than a simple combination.

In order to achieve the objective of the present disclosure, the present disclosure adopts the following technical solutions, which includes the following steps.

Step 1: Carbon cloth pretreatment is conducted: a carbon cloth of 10 cm×8 cm is pretreated. The carbon cloth is placed in anhydrous ethanol for ultrasonic treatment for 0.5 h, in acetone for ultrasonic treatment for 0.5 h, and in deionized water for ultrasonic treatment for 0.5 h. The carbon cloth is cleaned to make the carbon cloth more conductive and hydrophilic. The carbon cloth is dried after the ultrasonic treatment to obtain a carbon cloth A.

Step 2: A conductive tape is bonded to a surface of the pretreated carbon cloth A repeatedly. The conductive tape is torn off to remove floating hair on the surface of the carbon cloth A and burr the surface of the carbon cloth A. Excessive burrs are cut off to make the surface of the carbon cloth A covered with burrs with a length of 10-150 μm, so as to obtain a carbon cloth B.

Step 3: Casting solutions are prepared. A proportion of a casting solution 1 by total weight is as follows: 8-15% of polyacrylonitrile, 1-5% of nano titanium dioxide, 0.5-5% of macromolecular additive, 5-20% of small molecular additive, 0.5-2% of inorganic salt additive, of non-solvent, and 51-84.9% of solvent. A proportion of a casting solution 2 by total weight is as follows: 6-10% of polyacrylonitrile, 5-10% of nano titanium dioxide, 2-5% of macromolecular additive, 5-20% of small molecular additive, 0.5-2% of inorganic salt additive, of non-solvent, and 51-81.4% of solvent. A part of the solvent is weighed. The required nano titanium dioxide is added into the solvent. Ultrasonic treatment is conducted for 12-48 h. The nano titanium dioxide is taken out and other components are added according to the proportion. The casting solution is stirred for dissolution at 45-80° C. for 8-24 h. The casting solution is put in a vacuum drying oven with a negative pressure of 0.08 MPa and a temperature of 60° C. for standing and defoaming for 0.25-2 h for standby use.

The polyacrylonitrile has a molecular weight of 80,000-300,000 Daltons, and the nano titanium dioxide has a particle size of 10-300 nm.

The macromolecular additive is one or a mixture of two or more selected from the group consisting of PVP K90, PVP K60, PVP K30, PVP K17, Dow PEO, and hyperbranched polymer. The small molecular additive is one or a mixture of two or more selected from the group consisting of PEG 400, PEG 600, PEG 1000, PEG 6000, Tween 20, Tween 60, Tween 80, Span Span 60, Span 80, sodium dodecyl sulfate, sodium dodecyl benzene sulfonate, and sodium dodecyl sulfonate. The inorganic salt additive is one or a mixture of two or more selected from the group consisting of sodium chloride, lithium chloride, zinc chloride, magnesium chloride, calcium chloride, calcium carbonate, thiocyanate, perchlorate, and lithium bromide.

The non-solvent is one or a mixture of two or more selected from the group consisting of water, glycerol, ethylene glycol, ethyl alcohol, acetone, and n-octanol. The solvent is one or more selected from the group consisting of polar organic solvents such as dimethylformamide, dimethylacetamide, N-methylpyrrolidone, sulfolane, and ethyl nitrate ester.

Step 4: The carbon cloth B processed in step 2 is put with a burred side facing upwards. Four sides of the carbon cloth B are bonded to a glass plate with a tape. A film scraping thickness of a film scraper is adjusted to 50-100 μm. The defoamed casting solution 1 is poured onto the carbon cloth B. The film scraper is controlled to conduct film scraping uniformly to form a first layer of film on the carbon cloth B. After 0-60 s, the defoamed casting solution 2 is poured onto an upper end of the first layer of film. The film scraper is controlled to conduct film scraping uniformly to form a second layer of film on the first layer of film, where the carbon cloth B, the first layer of film, and the second layer of film form an integrity. After staying in air for 0-120 s, the integrity is slowly put into a first coagulation bath at 20-40° C. for 1-8 h, taken out and put into a second coagulation bath at 20-30° C. for 8-24 h, and then taken out and put into pure water for standby use.

The first coagulation bath is composed of 0-5% of macromolecular additive, 0-20% of small molecular additives, 0-2% of inorganic salt additive, 0-30% of solvent, and 43-100% of non-solvent. The second coagulation bath is composed of pure water.

The macromolecular additive is one or a mixture of two or more selected from the group consisting of PVP K90, PVP K60, PVP K30, PVP K17, Dow PEO, and hyperbranched polymer. The small molecular additive is one or a mixture of two or more selected from the group consisting of PEG 400, PEG 600, PEG 1000, PEG 6000, Tween 20, Tween 60, Tween 80, Span 20, Span 60, Span 80, sodium dodecyl sulfate, sodium dodecyl benzene sulfonate, and sodium dodecyl sulfonate. The inorganic salt additive is one or a mixture of two or more selected from the group consisting of sodium chloride, lithium chloride, zinc chloride, magnesium chloride, calcium chloride, calcium carbonate, thiocyanate, perchlorate, and lithium bromide.

The non-solvent is one or a mixture of two or more selected from the group consisting of water, glycerol, ethylene glycol, ethyl alcohol, acetone, and n-octanol. The solvent is one or more selected from the group consisting of polar organic solvents such as dimethylformamide, dimethylacetamide, N-methylpyrrolidone, sulfolane, and ethyl nitrate ester.

Technical Description

1, In step 1, the carbon cloth B is selected as the support of the separation membrane, so as to improve the mechanical properties of the separation membrane, the electron transmission efficiency, and the photocatalytic rate. The photothermal effect can improve the reaction rate and achieve sterilization.

2, In step 2, the conductive tape is bonded to the surface of the pretreated carbon cloth A repeatedly, and the conductive tape is torn off to remove floating hair on the surface of the carbon cloth A and burr the surface of the carbon cloth A. Excessive burrs are cut off to make the surface of the carbon cloth A covered with burrs with a length of 10-150 μm. Such operations are used to increase the adhesion between the carbon cloth B and the casting solution and improve the electron transmission efficiency and the photocatalytic rate.

3, In step 3, the casting solution is prepared with different proportions, so as to obtain separate membranes with different viscosity and properties. The titanium dioxide added can photocatalytically reduce uranium, generate oxygen free radicals for sterilization, and form the micro-nano structure on the surface of the separation membrane to increase the hydrophilicity and flux of the membrane. Other different additives are used to obtain separate membranes with different properties.

4, In step 3, the required nano titanium dioxide is added into the solvent, and subjected to ultrasonic treatment for 12-48 h, so as to make the titanium dioxide disperse uniformly and not easy to gather. The casting solution is stirred for dissolution at 45-80° C. for 8-24 h, so as to fully dissolve the casting solution and obtain a uniform casting solution. The casting solution is put in a vacuum drying oven with a negative pressure of 0.08 MPa and a temperature of 60° C. for standing and defoaming for 0.25-2 h, so as to remove bubbles in the casting solution and avoid defects in the prepared separation membrane.

5, In step 4, the carbon cloth is put with a burred side facing upwards, and four sides of the carbon cloth B are bonded to a glass plate with a tape, so as to make the carbon cloth B flat. In addition, the second layer of film is put into the coagulation bath after film scraping, such that it is not easy to float, thus avoiding membrane nonuniformity.

6, In step 4, a first layer of film is formed on the carbon cloth B, after 0-60 s, the defoamed casting solution 2 is poured onto an upper end of the first layer of film, and the film scraper is controlled to conduct film scraping uniformly to form a second layer of film, so as to make the carbon cloth B firmly bonded with the casting solution, and make the titanium dioxide fully contact with the carbon cloth B. The casting solution 1 has higher viscosity than the casting solution 2. The first layer of film is formed by scraping the casting solution 1 on the carbon cloth B, and the holes on the carbon cloth B are filled, so as to prevent the titanium dioxide from being deposited on the other side of the carbon cloth B and falling off easily, and prevent the prepared separation membrane from being nonuniform. The second layer of film is formed using the casting solution 2, so as to make the surface of the separation membrane contain more titanium dioxide, ensure the full reduction of uranium by photocatalysis, generate oxygen free radicals for sterilization, and form the micro-nano structure on the surface of the separation membrane to increase the hydrophilicity and flux of the membrane.

7, In step 4, the formed second layer of film stays in air for 0-120 s, so as to form dense layers of different thicknesses on the surface of the separation membrane. The prepared separation membrane is put into a first coagulation bath for 1-8 h, and is taken out and put into a second coagulation bath for 8-24 h, such that the surface of the prepared separation membrane has a micro-nano structure and excellent separation performance.

Beneficial Effects

1. The photothermal photocatalytic membrane prepared by the present disclosure can photocatalytically reduce uranium and separate the reduced uranium, and can separate and extract uranium during seawater desalination.

2. The photothermal photocatalytic membrane prepared by the present disclosure can be used as for seawater pretreatment before RO to prolong the service life of the RO membrane.

3. The photothermal photocatalytic membrane prepared by the present disclosure has certain mechanical strength, the separation membrane is not easy to damage, and the service life of the separation membrane is prolonged.

4. The surface of the photothermal photocatalytic membrane prepared by the present disclosure has a micro-nano structure, and has the function of sterilization and retention of bacteria. The Sodium hypochlorite is not added in the process of seawater pretreatment, so as to save costs.

5. Sterilization helps to extract uranium, and consumes free radicals, which in turn consumes holes, helping to extract uranium. The photothermal photocatalytic membrane prepared can ensure the seawater desalination and uranium extraction from seawater.

DETAILED DESCRIPTION OF THE EMBODIMENTS

The present disclosure is described in detail below with reference to specific examples. The following examples will help those skilled in the art to further understand the present disclosure, but do not limit the present disclosure in any way. It should be noted that those of ordinary skill in the art can further make several variations and improvements without departing from the idea of the present disclosure. These all fall within the protection scope of the present disclosure.

Example 1

Figure 4:
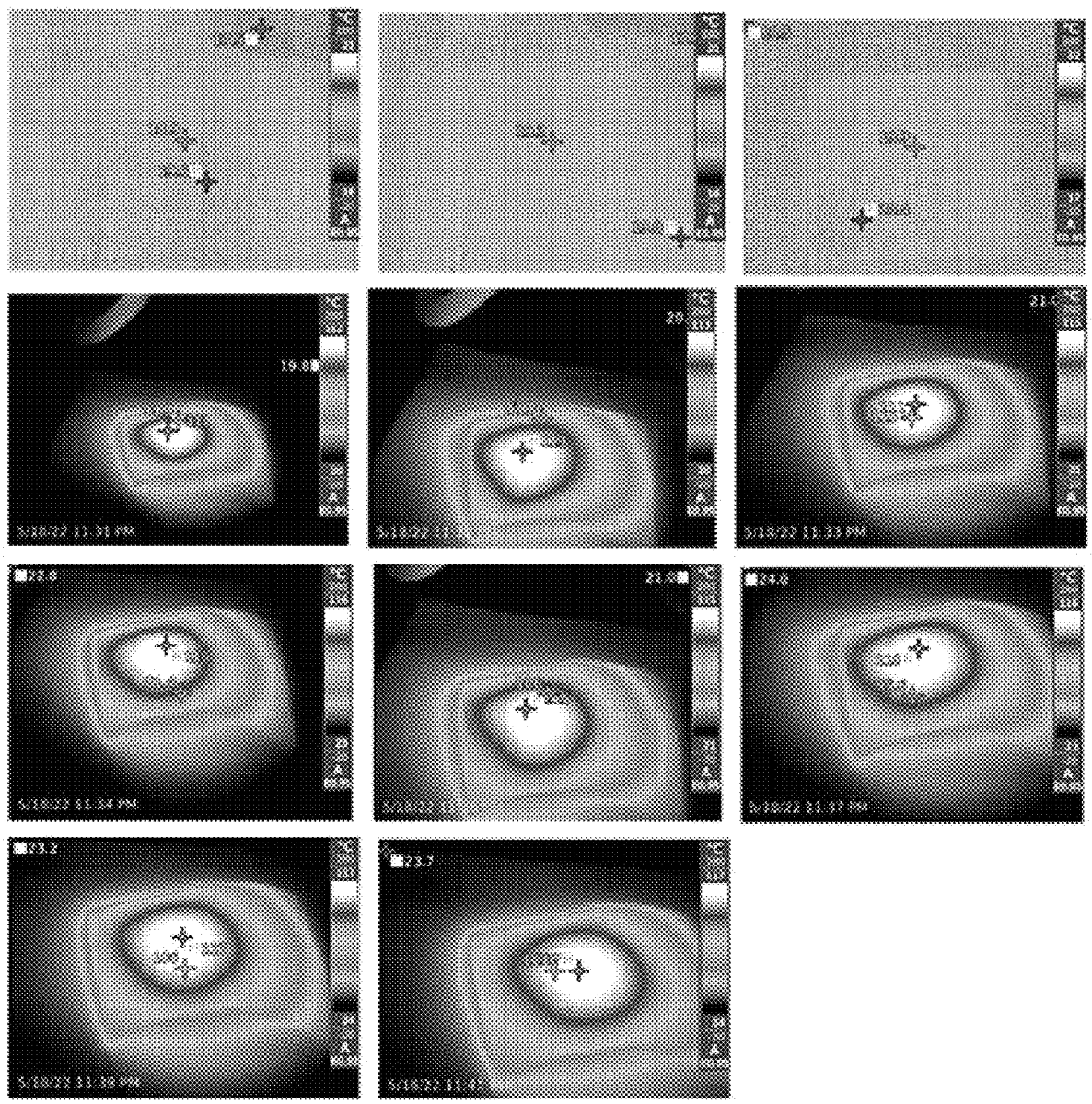
FIG. 4 shows photothermal maps of a carbon cloth A in Example 1.

Step 1: Carbon cloth pretreatment was conducted: a carbon cloth of 10 cm×8 cm was pretreated. The carbon cloth was placed in anhydrous ethanol for ultrasonic treatment for 0.5 h, in acetone for ultrasonic treatment for 0.5 h, and in deionized water for ultrasonic treatment for 0.5 h. The carbon cloth was cleaned to make the carbon cloth more conductive and hydrophilic. The carbon cloth was dried after the ultrasonic treatment to obtain a carbon cloth A. Photothermal maps of the carbon cloth A are shown in FIG. 4.

Step 2: A conductive tape was bonded to a surface of the pretreated carbon cloth A. The conductive tape was torn off. The operations were repeated for 3 times to remove floating hair on the surface of the carbon cloth A and burr the surface of the carbon cloth A. Excessive burrs were cut off to make the surface of the carbon cloth A covered with burrs with a length of 10-150 μm, so as to obtain a carbon cloth B.

Step 3: Casting solutions were prepared. A proportion of a casting solution 1 by total weight was as follows: 8-15% of polyacrylonitrile with a molecular weight of 80,000-300,000, 1-5% of nano titanium dioxide with a particle size of 10-300 nm, 0.5-5% of macromolecular additive, 5-20% of small molecular additive, 0.5-2% of inorganic salt additive, 0.1-2% of non-solvent, and 51-84.9% of solvent. A proportion of a casting solution 2 by total weight was as follows: 6-10% of polyacrylonitrile with a molecular weight of 80,000-300,000, 5-10% of nano titanium dioxide with a particle size of 10-300 nm, 2-5% of macromolecular additive, 5-20% of small molecular additive, 0.5-2% of inorganic salt additive, 0.1-2% of non-solvent, and 51-81.4% of solvent. 100 g of the solvent was weighed. The required nano titanium dioxide was added into the solvent. Ultrasonic treatment was conducted for 24 h. The nano titanium dioxide was taken out and other components were added according to the proportion. The casting solution was stirred for dissolution at 80° C. for 12 h. The casting solution was put in a vacuum drying oven with a negative pressure of 0.08 MPa and a temperature of 60° C. for standing and defoaming for 0.25-2 h for standby use.

Step 4: The carbon cloth B processed in step 2 was put with a burred side facing upwards. Four sides of the carbon cloth B were bonded to a glass plate with a tape. A film scraping thickness of a film scraper was adjusted to 50-100 μm. The defoamed casting solution 1 was poured onto the carbon cloth B. The film scraper was controlled to conduct film scraping uniformly to form a first layer of film on the carbon cloth B. After 0-60 s, the defoamed casting solution 2 was poured onto an upper end of the first layer of film. The film scraper was controlled to conduct film scraping uniformly to form a second layer of film on the first layer of film, where the carbon cloth B, the first layer of film, and the second layer of film form an integrity. After staying in air for 0-120 s, the integrity was slowly put into a first coagulation bath at 20-40° C. for 1-8 h, taken out and put into a second coagulation bath at 20-30° C. for 8-24 h, and then taken out and put into pure water for standby use. Photographs of preparation of the photothermal photocatalytic membrane are shown in FIGS. 1A-1E.

The photothermal photocatalytic membrane for seawater desalination and uranium extraction prepared by this example was a membrane prepared by a phase conversion method with the carbon cloth B as a support, polyacrylonitrile as a skeleton, and titanium dioxide as a filler.

Example 2

Figure 1A:
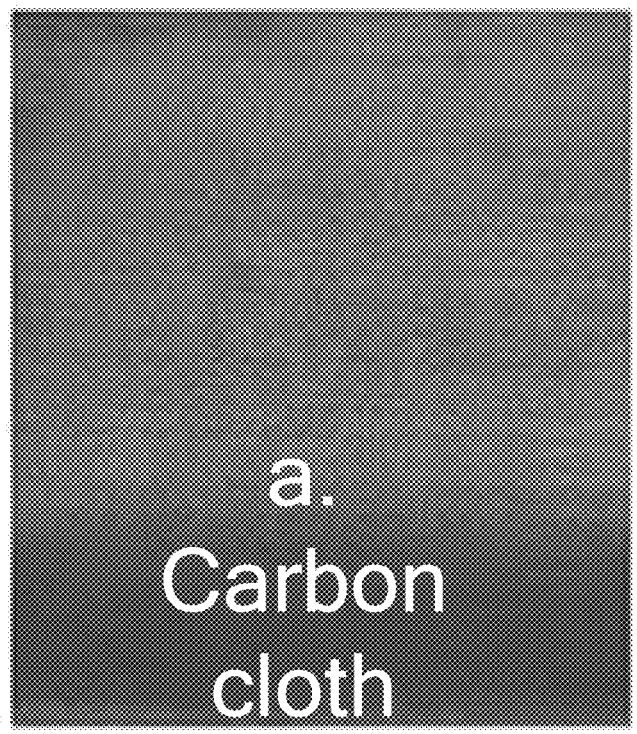
FIGS. 1A-1E show photographs of preparation of a photothermal photocatalytic membrane in Example 1.
Figure 1B:
Figure 1C:
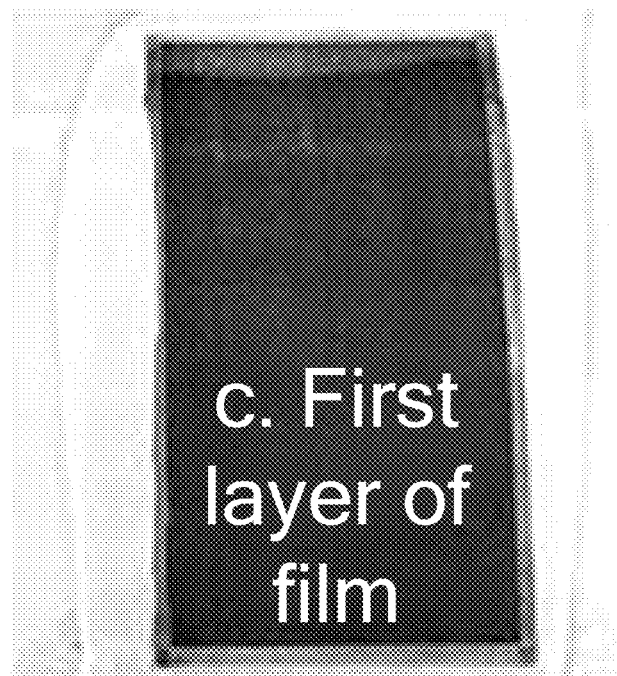
Figure 1D:
Figure 1E:
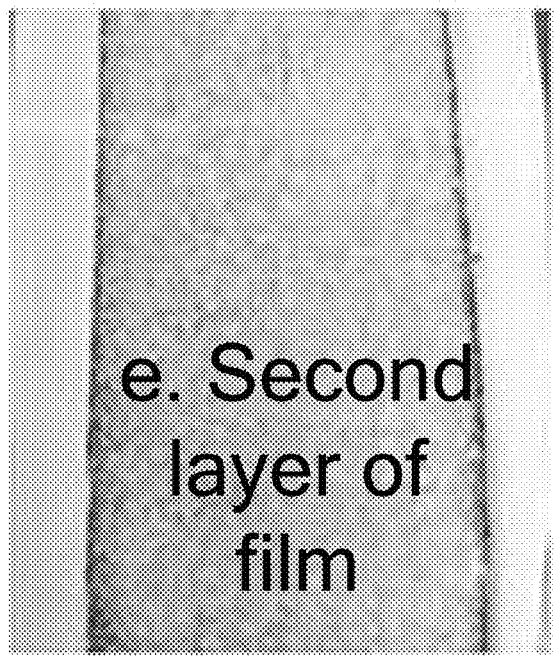
Figure 2:
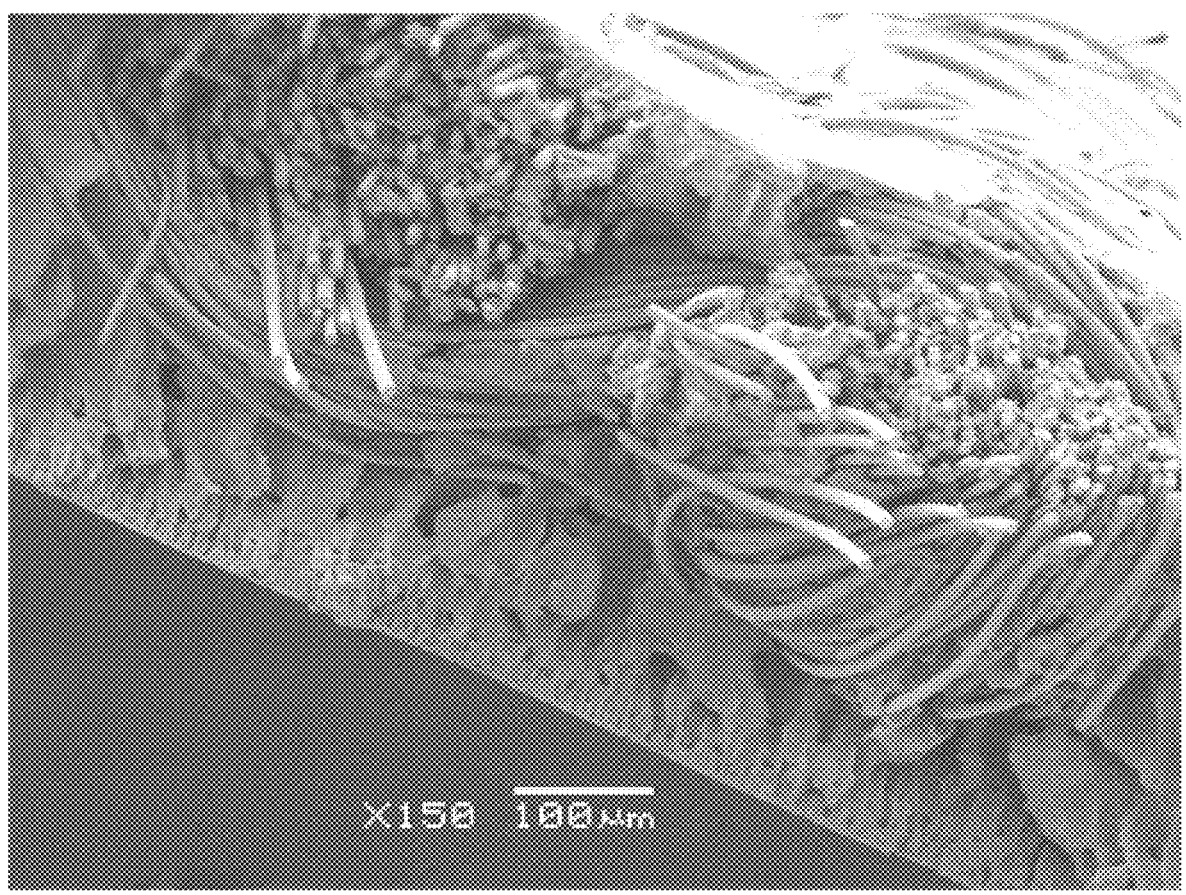
FIG. 2 shows an electronic micrograph of a photothermal photocatalytic membrane prepared in Example 2.
Figure 3:
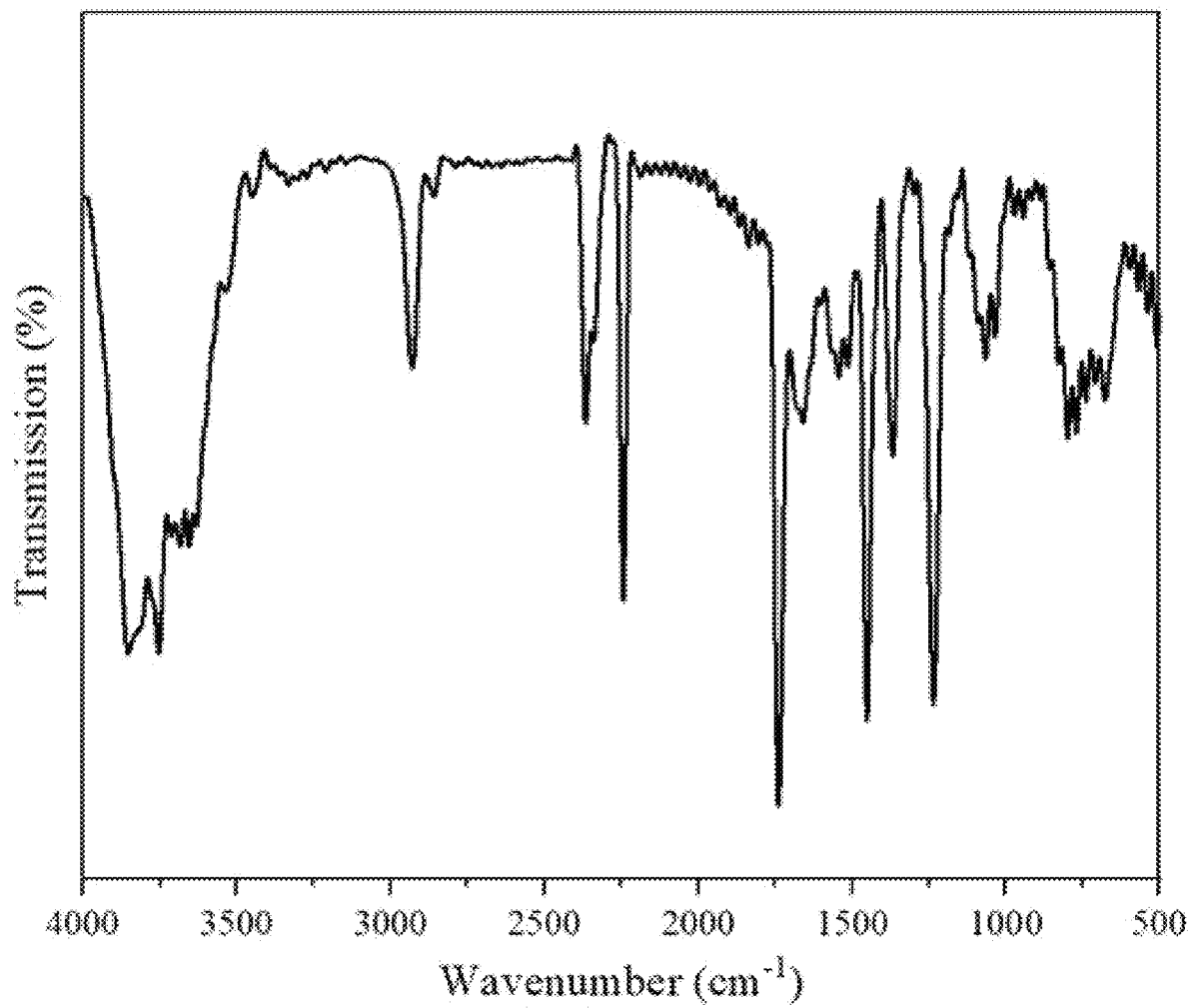
FIG. 3 shows an infrared image of the photothermal photocatalytic membrane prepared in Example 2.

This example was basically the same as the photothermal photocatalytic membrane for seawater desalination and uranium extraction and the preparation method therefor mentioned in Example 1. The difference was that both the first coagulation bath and the second coagulation bath were composed of pure water, the first coagulation bath was at 30° C., and the second coagulation bath was at 25° C. An electronic micrograph of the photothermal photocatalytic membrane is shown in FIG. 2. An infrared image is shown in FIG. 3.

The photothermal photocatalytic membrane for seawater desalination and uranium extraction prepared by this example was a membrane prepared by a phase conversion method with the carbon cloth B as a support, polyacrylonitrile as a skeleton, and titanium dioxide as a filler. The photothermal photocatalytic membrane had a structure of a dense skin layer and a finger-like porous supporting layer.

Figure 5:
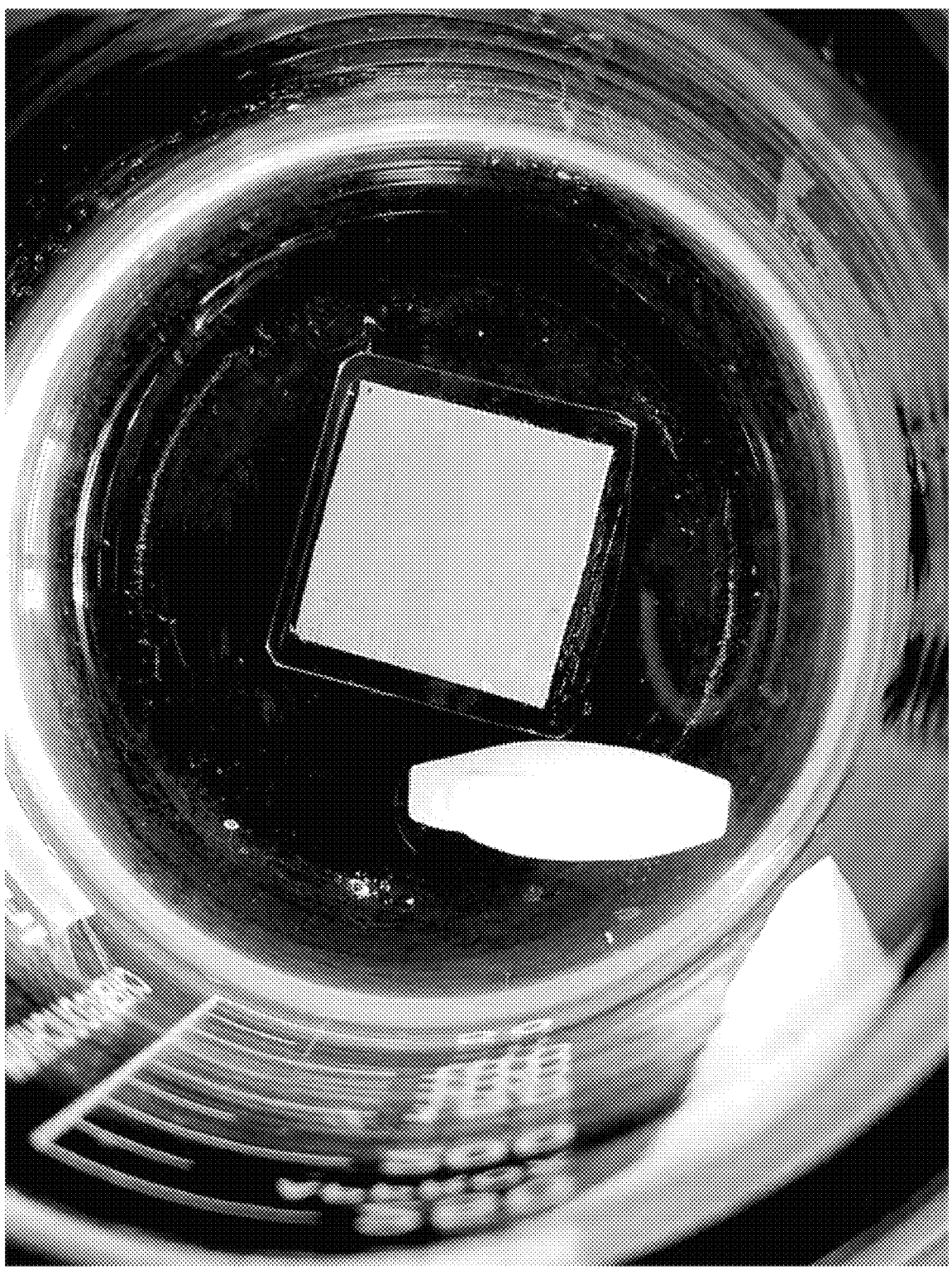
FIG. 5 shows a physical picture of photocatalytic reduction of uranium of the photothermal photocatalytic membrane prepared in Example 2.
Figure 6:
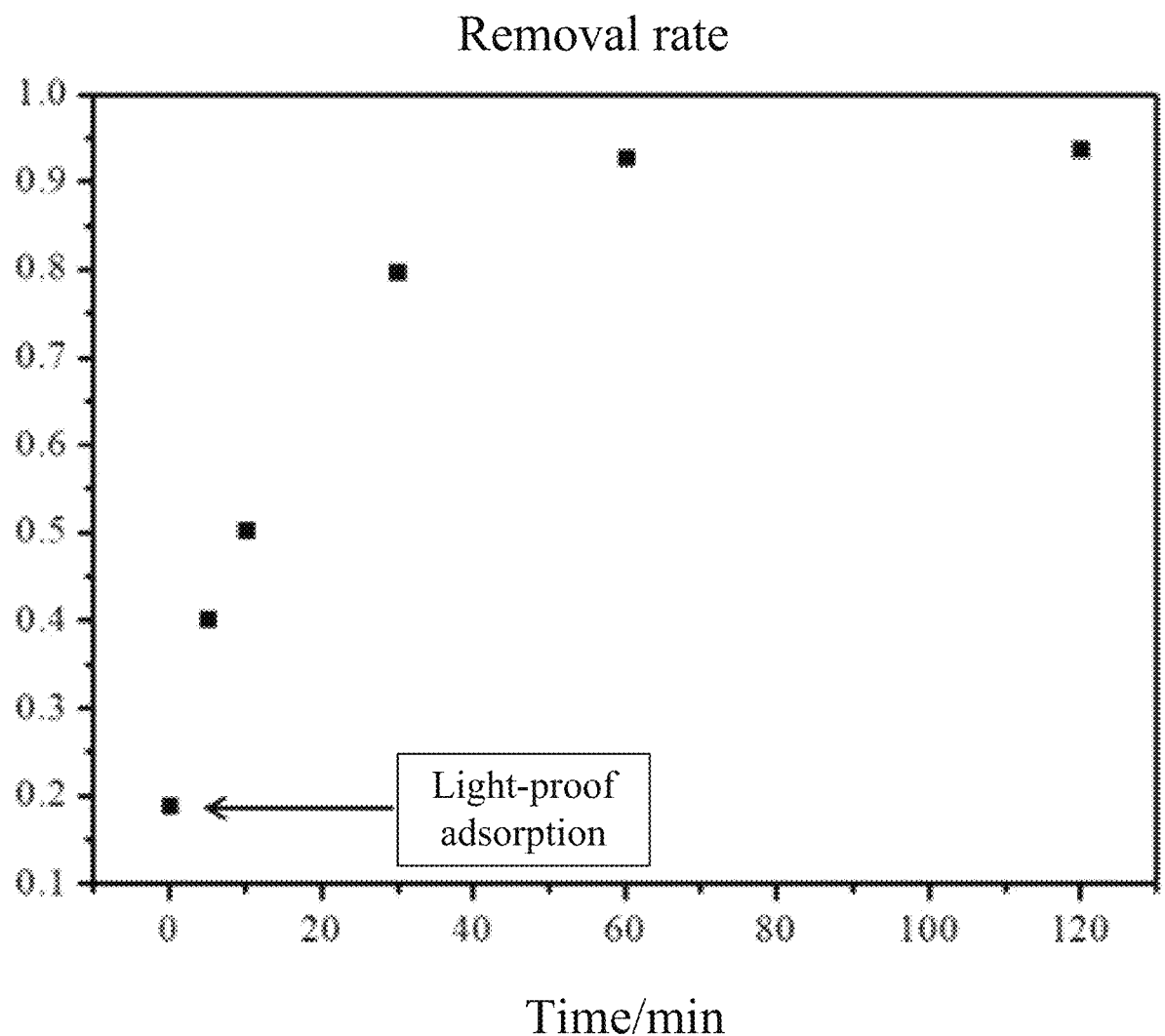
FIG. 6 shows a diagram of a changing trend of a removal rate of photocatalytic reduction of uranium of the photothermal photocatalytic membrane prepared in Example 2 over time.
Figure 7:
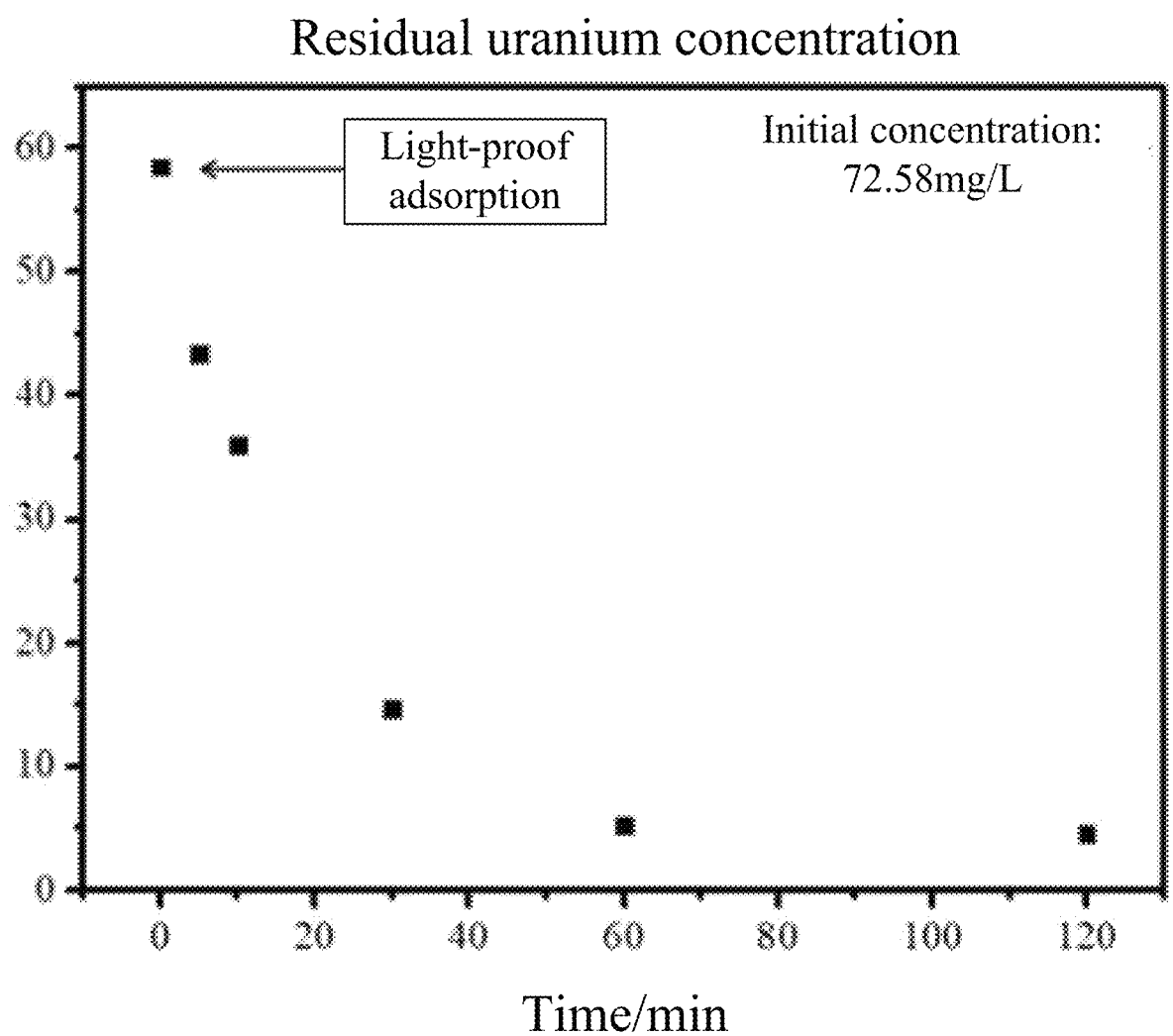
FIG. 7 shows a diagram of a changing trend of a residual uranium concentration in photocatalytic reduction of uranium of the photothermal photocatalytic membrane prepared in Example 2 over time.

Technical description of example: instantaneous phase separation occurred in the phase conversion process of the photothermal photocatalytic membrane prepared by this example. The membrane pore was relatively large. The pure water flux of the separation membrane reached 2,500 L/m² h. The bulked segregant analysis (BSA) retention rate reached 45%. A physical picture of photocatalytic reduction of uranium of the photothermal photocatalytic membrane is shown in FIG. 5. A diagram of a changing trend of a removal rate of its photocatalytic reduction of uranium over time is shown in FIG. 6. A diagram of a changing trend of a residual uranium concentration in its photocatalytic reduction of uranium over time is shown in FIG. 7. The removal rate of uranium by photocatalysis reached 95% within 1 h.

Example 3

This example was basically the same as the photothermal photocatalytic membrane for seawater desalination and uranium extraction and the preparation method therefor mentioned in Example 2. The difference was that in step 3, in the casting solution 1, a percentage of a weight of the polyacrylonitrile with a molecular weight of 80,000-300,000 in the total weight was 12%, and the nano titanium dioxide had a particle size of 10-100 nm, and in the casting solution 2, a percentage of a weight of the polyacrylonitrile with a molecular weight of 80,000-300,000 in the total weight was 8%, and the nano titanium dioxide had a particle size of 10-100 nm.

The photothermal photocatalytic membrane for seawater desalination and uranium extraction prepared by this example was a membrane prepared by a phase conversion method with the carbon cloth B as a support, polyacrylonitrile as a skeleton, and titanium dioxide with a particle size of 10-100 nm as a filler. The photothermal photocatalytic membrane had a structure of a dense skin layer and a finger-like porous supporting layer.

Technical description of example: instantaneous phase separation occurred in the phase conversion process of the photothermal photocatalytic membrane prepared by this example. The membrane pore was relatively large. The pure water flux of the separation membrane reached 2,500 L/m² h. The BSA retention rate reached 47%. The removal rate of uranium by photocatalysis reached 93% within 1 h.

Example 4

This example was basically the same as the photothermal photocatalytic membrane for seawater desalination and uranium extraction and the preparation method therefor mentioned in Example 1. The difference was that in a process of preparing the casting solutions, a proportion of a casting solution 1 by total weight was as follows: 14% of polyacrylonitrile with a molecular weight of 80,000, 3% of nano titanium dioxide with a particle size of 10-100 nm, 2% of PVP K90, 15% of PEG 1000, 0.5% of zinc chloride, 1% of ethylene glycol, 40% of dimethylacetamide, and 24.5% of dimethylformamide, and a proportion of a casting solution 2 by total weight was as follows: 10% of polyacrylonitrile with a molecular weight of 80,000, 8% of nano titanium dioxide with a particle size of 100-300 nm, 1% of PVP K30, 15% of PEG 400, of zinc chloride, 0.5% of ethylene glycol, and 65% of dimethylformamide. The process of preparing the casting solutions specifically included the following sub-steps. 100 g of a dimethylformamide solvent was weighed. The required nano titanium dioxide was added into the solvent. Ultrasonic treatment was conducted for 24 h. The nano titanium dioxide was taken out and other components were added according to the proportion. The casting solution was stirred for dissolution at 80° C. for 12 h, and the casting solution was put in a vacuum drying oven with a negative pressure of 0.08 MPa and a temperature of 60° C. for standing and defoaming for 0.5 h for standby use. The first coagulation bath was composed of 5% of PVP K30, 5% of Tween 80, 20% of dimethylformamide, 10% of dimethylacetamide, 25% of glycerol, and 35% of pure water, and the first coagulation bath was at 25° C. After 4 h, the second layer of film was taken out and put into pure water of the second coagulation bath, and the second coagulation bath was at 25° C. for 24 h. The second layer of film was taken out and put into pure water for standby use.

The photothermal photocatalytic membrane for seawater desalination and uranium extraction prepared by this example was a membrane prepared by a phase conversion method with the carbon cloth B as a support, polyacrylonitrile with a molecular weight of 80,000 as a skeleton, and titanium dioxide with a particle size of 10-300 nm as a filler. The photothermal photocatalytic membrane had a structure of a dense skin layer and a sponge-like porous supporting layer.

Technical description of example: in this example, by controlling polymer concentration and the composition of the coagulation bath and regulating the phase conversion rate of the photothermal photocatalytic membrane during phase conversion, the removal rate of uranium by photocatalysis of the prepared photothermal photocatalytic membrane reached 91% within 1 h, the pure water flux of the separation membrane reached 1,720 L/m² h, and the BSA retention rate reached 62%, which was improved.

Example 5

This example was basically the same as the photothermal photocatalytic membrane for seawater desalination and uranium extraction and the preparation method therefor mentioned in Example 4. The difference was that in step 2, the surface of the carbon cloth A was covered with burrs with a length of 70 μm to obtain the carbon cloth B, and in step 4, when the casting solution 1 was scraped, the film scraping thickness of the film scraper was adjusted to 50 μm, and when the casting solution 2 was scraped, the film scraping thickness of the film scraper was adjusted to 100 μm.

The photothermal photocatalytic membrane for seawater desalination and uranium extraction prepared by this example was a membrane prepared by a phase conversion method with the carbon cloth B as a support, polyacrylonitrile with a molecular weight of 80,000 as a skeleton, and titanium dioxide as a filler. Both a skin layer and a supporting layer of the photothermal photocatalytic membrane were of a sponge-like porous structure.

Technical description of example: in this example, by controlling the film scraping thickness and regulating the phase conversion rate of the photothermal photocatalytic membrane during phase conversion, the removal rate of uranium by photocatalysis of the prepared photothermal photocatalytic membrane reached 96% within 1 h, the pure water flux of the separation membrane reached 1,830 L/m² h, and the BSA retention rate reached 55%.

Example 6

This example was basically the same as the photothermal photocatalytic membrane for seawater desalination and uranium extraction and the preparation method therefor mentioned in Example 1. The difference was that in a process of preparing the casting solutions, a proportion of a casting solution 1 by total weight was as follows: 13% of polyacrylonitrile with a molecular weight of 150,000, 2% of nano titanium dioxide with a particle size of 10-100 nm, 2% of Dow PEO 750, 10% of PEG 600, 0.5% of lithium chloride, 1% of glycerol, 10% of N-methylpyrrolidone, and 61.5% of dimethylformamide, and a proportion of a casting solution 2 by total weight was as follows: 8% of polyacrylonitrile with a molecular weight of 150,000, 8% of nano titanium dioxide with a particle size of 100-300 nm, 1% of hyperbranched polymer, 5% of Tween 20, 0.5% of sodium chloride, 0.5% of ethyl alcohol, and 77% of dimethylformamide. The process of preparing the casting solutions specifically included the following steps. 200 g of a dimethylformamide solvent was weighed. The required nano titanium dioxide was added into the solvent. Ultrasonic treatment was conducted for 48 h. The nano titanium dioxide was taken out and other components were added according to the proportion. The casting solution was stirred for dissolution at 60° C. for 24 h, and the casting solution was put in a vacuum drying oven with a negative pressure of 0.08 MPa and a temperature of 60° C. for standing and defoaming for 0.5 h for standby use. The method further included the following steps. The film scraping thickness of the film scraper was adjusted to 50 μm. The defoamed casting solution 1 was poured onto the carbon cloth. The film scraper was controlled to conduct film scraping uniformly to form a first layer of film on the carbon cloth. The defoamed casting solution 2 was poured onto an upper end of the first layer of film immediately. The film scraping thickness of the film scraper was adjusted to 100 μm, and the film scraper was controlled to conduct film scraping uniformly to form a second layer of film on the first layer of film, where the carbon cloth, the first layer of film, and the second layer of film form an integrity. After staying in air for 45 s, the integrity was slowly put into the first coagulation bath. The first coagulation bath was composed of 5% of Tween 20, 20% of dimethylformamide, 5% of ethyl alcohol, 20% of glycerol, and 50% of pure water, and the first coagulation bath was at 25° C. After 4 h, the integrity was taken out and put into pure water of the second coagulation bath at 25° C. for 24 h, and then taken out and put into pure water for standby use.

The photothermal photocatalytic membrane for seawater desalination and uranium extraction prepared by this example was a membrane prepared by a phase conversion method with the carbon cloth B as a support, polyacrylonitrile with a molecular weight of 150,000 as a skeleton, and titanium dioxide with a particle size of 10-300 nm as a filler. Both a skin layer and a supporting layer of the photothermal photocatalytic membrane were of a sponge-like porous structure.

Technical description of example: in this example, by controlling the viscosity of the casting solution and the composition of the coagulation bath and regulating the phase conversion rate of the photothermal photocatalytic membrane during phase conversion, the removal rate of uranium by photocatalysis of the prepared photothermal photocatalytic membrane reached 80% within 1 h, the pure water flux of the separation membrane reached 955 L/m$^2$ h, and the BSA retention rate reached 82%. The membrane retention rate was significantly improved.

What is claimed is:
1. A preparation method for a photothermal photocatalytic membrane for seawater desalination and uranium extraction, comprising the following steps:
step 1: conducting carbon cloth pretreatment: pretreating a carbon cloth of 10 cm×8 cm, by placing the carbon cloth in anhydrous ethanol for ultrasonic treatment for 0.5 h, then in acetone for ultrasonic treatment for 0.5 h, and then in deionized water for ultrasonic treatment for 0.5 h, thereby cleaning the carbon cloth to make the carbon cloth more conductive and hydrophilic, and then drying the carbon cloth after the ultrasonic treatments to obtain a carbon cloth A;
step 2: bonding a conductive tape to a surface of the carbon cloth A, tearing off the conductive tape, repeating for 3 times to remove floating hair on the surface of the carbon cloth A and burr the surface of the carbon cloth A to form burrs, and treating the burrs so that the surface of the carbon cloth A is covered with burrs having a length of 10-150 μm, so as to obtain a carbon cloth B;
step 3: preparing casting solutions, wherein a proportion of a casting solution 1 by total weight is as follows: 8-15% of polyacrylonitrile having a molecular weight of 80,000-300,000, 1-5% of nano titanium dioxide having a particle size of 10-300 nm, 0.5-5% of macromolecular additive, 5-20% of small molecular additive, 0.5-2% of inorganic salt additive, 0.1-2% of non-solvent, and 51-84.9% of solvent, and a proportion of a casting solution 2 by total weight is as follows: 6-10% of polyacrylonitrile having a molecular weight of 80,000-300,000, 5-10% of nano titanium dioxide having a particle size of 10-300 nm, 2-5% of macromolecular additive, 5-20% of small molecular additive, 0.5-2% of inorganic salt additive, 0.1-2% of non-solvent, and 51-81.4% of solvent; weighing 100 g of the solvent, adding the nano titanium dioxide having a particle size of 10-300 nm into the solvent, conducting ultrasonic treatment for 24 h to obtain a mixture system, adding the remaining components to the mixture system to obtain a casting solution (i.e., the casting solution 1 or the casting solution 2), stirring the casting solution for dissolution at 80° C. for 12 h, and putting the casting solution in a vacuum drying oven with a negative pressure of 0.08 MPa and a temperature of 60° C. for standing and defoaming for 0.25-2 h to obtain a defoamed casting solution, i.e., a defoamed casting solution 1 or a defoamed casting solution 2; and
step 4: putting the carbon cloth B obtained in step 2 with a burred side facing upwards, bonding four sides of the carbon cloth B to a glass plate with a tape, adjusting a film scraping thickness of a film scraper to 50-100 μm, pouring the defoamed casting solution 1 onto the carbon cloth B, and controlling the film scraper to conduct film scraping to form a first layer of film on the carbon cloth B; after 0-60 s, pouring the defoamed casting solution 2 onto an upper end of the first layer of film, controlling the film scraper to conduct film scraping to form a second layer of film on the first layer of film, wherein the carbon cloth B, the first layer of film, and the second layer of film form an integrity; letting the integrity stay in air for 0-120 s, slowly putting the integrity into a first coagulation bath at 20-40° C. for 1-8 h, taking out, and then putting the integrity into a second coagulation bath at 20-30° C. for 8-24 h to obtain the photothermal photocatalytic membrane for seawater desalination and uranium extraction, wherein the macromolecular additive is one or a mixture of two or more selected from the group consisting of PVP K90, PVP K60, PVP K30, PVP K17, Dow PEO, and hyperbranched polymer, the small molecular additive is one or a mixture of two or more selected from the group consisting of PEG 400, PEG 600, PEG 1000, PEG 6000, Tween 20, Tween 60, Tween 80, Span 20, Span 60, Span 80, sodium dodecyl sulfate, sodium dodecyl benzene sulfonate, and sodium dodecyl sulfonate.

2. The preparation method for a photothermal photocatalytic membrane for seawater desalination and uranium extraction according to claim 1, wherein both the first coagulation bath and the second coagulation bath are composed of pure water, the first coagulation bath is conducted at 30° C., and the second coagulation bath is conducted at 25° C.

3. The preparation method for a photothermal photocatalytic membrane for seawater desalination and uranium extraction according to claim 2, wherein in step 3, in the casting solution 1, a percentage of a weight of the polyacrylonitrile having a molecular weight of 80,000-300,000 in the total weight is 12%, and the nano titanium dioxide has a particle size of 10-100 nm, and in the casting solution 2, a percentage of a weight of the polyacrylonitrile having a molecular weight of 80,000-300,000 in the total weight is 8%, and the nano titanium dioxide has a particle size of 10-100 nm.

4. A photothermal photocatalytic membrane for seawater desalination and uranium extraction, wherein the membrane is a membrane prepared by the preparation method for a photothermal photocatalytic membrane for seawater desalination and uranium extraction according to claim 1, and the membrane comprises the carbon cloth B as a support, the polyacrylonitrile as a skeleton, and the nano titanium dioxide as a filler.

5. The photothermal photocatalytic membrane for seawater desalination and uranium extraction according to claim 4, wherein the membrane has a structure of a skin layer and a finger-like porous supporting layer.

6. The photothermal photocatalytic membrane for seawater desalination and uranium extraction according to claim 4, wherein the membrane has a structure of a skin layer and a sponge-like porous supporting layer, and is prepared by a phase conversion method with the polyacrylonitrile having a molecular weight of 80,000 as the skeleton and the nano titanium dioxide having a particle size of 10-300 nm as the filler.

7. The photothermal photocatalytic membrane for seawater desalination and uranium extraction according to claim 4, wherein the membrane is prepared by a phase conversion method with the polyacrylonitrile having a molecular weight of 150,000 as the skeleton and the nano titanium dioxide having a particle size of 10-300 nm as the filler, and both a skin layer and a supporting layer of the membrane are of a sponge-like porous structure.

8. The photothermal photocatalytic membrane for seawater desalination and uranium extraction according to claim 4, wherein both the first coagulation bath and the second coagulation bath are composed of pure water, the first coagulation bath is conducted at 30° C., and the second coagulation bath is conducted at 25° C.

9. The photothermal photocatalytic membrane for seawater desalination and uranium extraction according to claim 4, wherein in step 3, both the first coagulation bath and the second coagulation bath are composed of pure water, the first coagulation bath is conducted at 30° C., and the second coagulation bath is conducted at 25° C., and in the casting solution 1, a percentage of a weight of the polyacrylonitrile having a molecular weight of 80,000-300,000 in the total weight is 12%, and the nano titanium dioxide has a particle size of 10-100 nm, and in the casting solution 2, a percentage of a weight of the polyacrylonitrile having a molecular weight of 80,000-300,000 in the total weight is 8%, and the nano titanium dioxide has a particle size of 10-100 nm.

* * * * *